C. H. LISTER.
HOBBYHORSE.
APPLICATION FILED OCT 27, 1920.
1,424,364.
Patented Aug. 1, 1922.
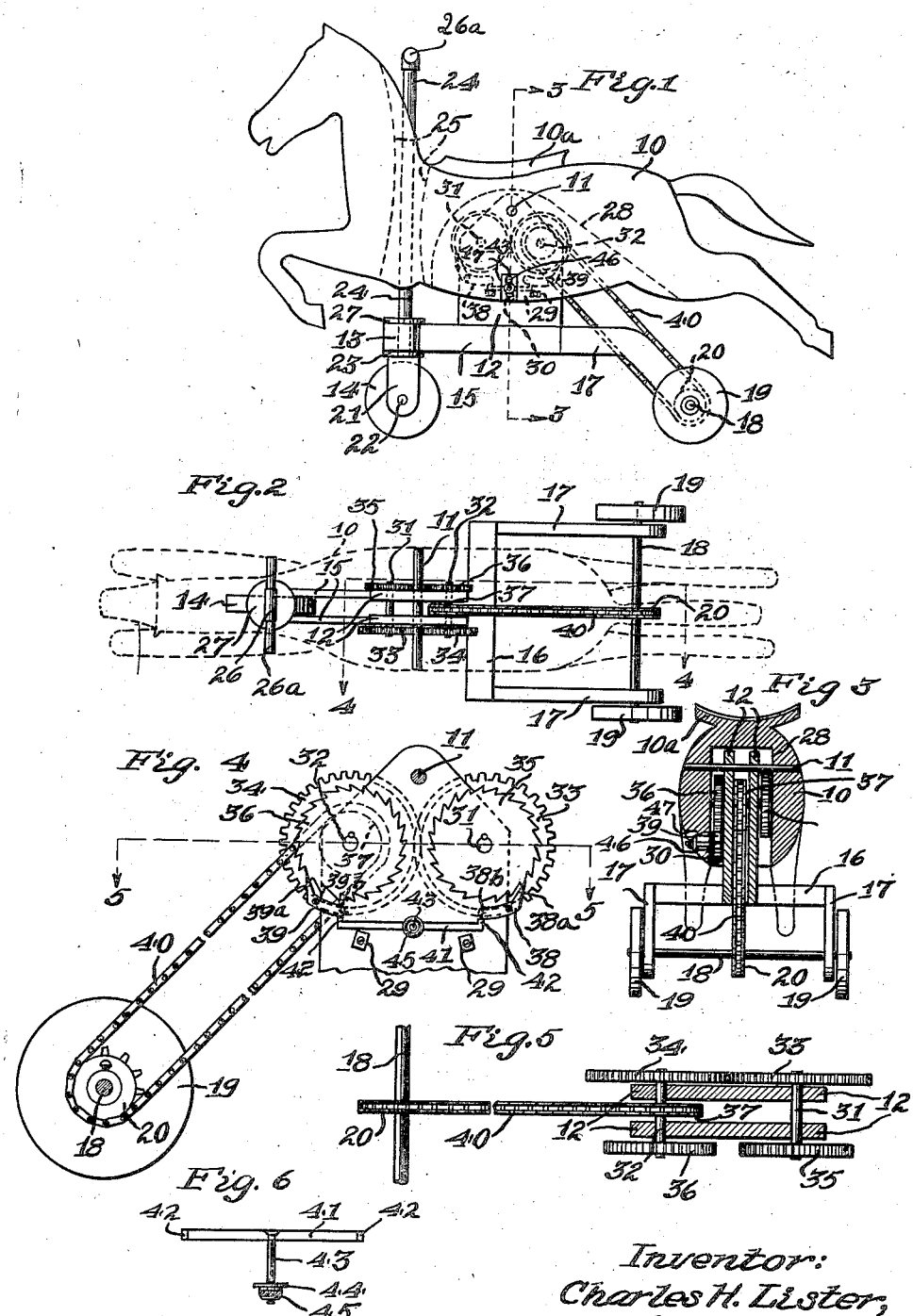
Inventor:
Charles H. Lister,
by: John E. Shipku
Attorney.

UNITED STATES PATENT OFFICE.

CHARLES H. LISTER, OF NORTH ST. PAUL, MINNESOTA.

HOBBYHORSE.

1,424,364. Specification of Letters Patent. Patented Aug. 1, 1922.

Application filed October 27, 1920. Serial No. 419,861.

*To all whom it may concern:*

Be it known that I, CHARLES H. LISTER, a citizen of the United States, residing at North St. Paul, in the county of Ramsey and State of Minnesota, have invented new and useful Improvements in Hobbyhorses, of which the following is a specification.

The object of my invention is to provide a new and useful hobby horse.

More specifically it is my object to provide a toy of this kind with simple propelling means.

A further object of my invention is to provide means whereby rocking motion given to a hobby horse body will be transmitted into linear motion of the device as a whole.

Referring to the accompanying drawings, Figure 1 is a side elevation of my improved hobby horse; Fig. 2 is a plan view of the same, the body of the horse being shown in dotted lines; Fig. 3 is a section taken on the line 3—3 of Figure 1; Fig. 4 is a section taken on the line 4—4 of Figure 2; Figure 5 is a section taken on the line 5—5 of Figure 4 and Fig. 6 is a detail plan view of the pawl disengaging mechanism.

In the drawings I have used the numeral 10 to indicate the body of the horse which is tiltably mounted on a transverse rod 11. This rod passes through perforations in the body 10 and through two standards 12 of the frame. The frame of my device consists of a cylindrical bearing 13, for a front wheel 14, longitudinal side bars 15, to which the standards 12 are rigidly fastened, and a transverse bar 16 to the ends of which are rigidly secured a pair of bars 17 in which the rear axle 18, carrying the wheels 19, is journalled. The wheels 19 are fast on the axle 18. A sprocket gear 20, rigidly mounted on the axle 18 near its middle point, is provided to engage the driving means hereinafter described and revolve said axle 18.

The wheel 14 is revolubly mounted between a pair of downwardly extending ears 21 on an axle 22. The ears 21 are rigidly attached to the underside of a disc 23 and a vertical steering rod 24 is rigidly secured to the center of the disc 23. Extending through the bearing 13, the steering rod 24 passes through a slot 25 in the body of the horse and is formed with a cross bar 26 at its upper end. A disc 27 fastened to the rod 24, just above the bearing 13, prevents longitudinal movement in said bearing but allows the rod 24 to be rotated to steer my device. A pair of grips $26^a$ are formed on the ends of the cross bar 26.

The body 10 is hollow, being formed with a recess 28 which serves as a housing for the advancing mechanism. Rocking movement of the body 10 on the rod 11 is limited by a pair of stops 29 on one of the standards 12. Said stops are struck at the end of each rocking movement by a padded peg 30 rigidly mounted in the recess 28. Transverse shafts 31 and 32 have bearings in the standards 12 and project through said standards to receive pinion gears 33 and 34 and ratchet wheels 35 and 36. These gears and ratchet wheels are rigidly mounted on the ends of the shafts 31 and 32 and a sprocket gear 37 is fast on the shaft 32 between the standards 12. The gears 33 and 34 mesh and the ratchet wheels 35 and 36 are arranged to be engaged and rotated by a pair of pawls 38 and 39 which are pivotally mounted in the body 10. A sprocket chain 40 is provided to drive the sprocket gear 20 on the rear axle 18 from the sprocket gear 37 on the shaft 32.

The arrangement of the ratchet wheels 35 and 36, on the standards 12, and the pawls 38 and 39, on the body 10, is such that rocking of the body rotates said sprocket wheels and the shafts 31 and 32 in opposite directions. The pointed ends $38^a$ and $39^a$, of the pawls 38 and 39, are kept in contact with the periphery of the ratchet wheels 35 and 36, respectively, by means of weights $38^b$ and $39^b$ formed on the ends of the pawls opposite their pointed ends. A saddle $10^a$, formed on the body 10 above its pivot point, is adapted to be occupied by a child.

In order to permit my device to be reversed and also to allow rocking movement without advancing the carriage I provide simple mechanism for disengaging and holding the pawls 38 and 39 out of contact with the notches in the ratchet 35 and 36. This mechanism consists of a horizontal bar 41 having upturned ends 42 and a bolt 43 which is fastened to said bar at one end and provided with a washer 44 and knurled nut 45 on its other end. The bolt 43 passes through a slot 46 in the body of the horse, the washer 44 and nut 45 being adjustable vertically in a recess 47 in the horse's side. The bar 41 normally rests on the stops 29 but when it is desired to disengage the pawls 38 and 39, the nut 45 is loosened and the bolt 43, together with the washer 44 and bar 41, are moved upward in the slot 46 causing the ends 42, of said bar, to raise the ends 38$^b$ and 39$^b$ of said pawls thus disengaging the pawls. To hold the latter in this position the knurled nut 45 is tightened.

In operation a child sitting in the saddle 10$^a$ grasps the grips 26$^a$ on the steering rod 24 and imparts rocking motion to the body 10. On the rocking stroke, during which the horse's head is moving downward, the pawl 39 engages the notches in the ratchet 36 and, by means of the shaft 32, sprocket gear 37, chain 40 and sprocket gear 20, rotates the shaft 18, carrying the rear wheels 19, in a forward direction, thus advancing the device as a whole. On the upward stroke of the horse's head the pawl 39 idles and the pawl 38 engages the notches in the ratchet 35, rotates said ratchet and advances the hobby horse by means of the shaft 31, meshing pinion gears 33 and 34, shaft 32, sprocket gear 37, chain 40 and sprocket gear 20. The stops 29 and peg 30 prevent the pawls 38 and 39 from being carried beyond the points where they engage the ratchets 35 and 36. In addition to affording steering means the rod 24 and grips 26 furnish a stationary support against which the child may push in imparting tilting motion to the body 10.

In the foregoing specification I have referred to my invention as a hobby horse but it is, of course, obvious that any rocking seat propelled by similar means, would be within the spirit of my invention, and it is my intention to include all such devices in the term hobby horse.

Having described my invention what I claim as new and desire to protect by Letters Patent is:

1. In a hobby horse, a frame, a driving wheel journalled in said frame, a standard mounted on said frame, a hollow body tiltably supported on said standard, a pair of shafts journalled in said standard within said hollow body, a pair of meshing gears and ratchets mounted on said shafts, pawls arranged within said body to severally engage said ratchets and a chain operatively connecting one of said shafts with said driving wheel.

2. In a hobby horse, a frame, driving wheels journalled in said frame, a hollow body tiltably mounted on said frame and gearing mounted on said frame and pawls on said body whereby tilting said body will rotate said driving wheels.

3. In a hobby horse a frame, driving wheels journalled in said frame, a body tiltably mounted on said frame, a pair of shafts journalled in said frame, ratchets and pinion gears on each of said shafts, said pinion gears being in mesh, pawls mounted on said body adjacent to said ratchets and means operatively connecting one of said shafts with said driving wheels.

4. In a hobby horse, a frame, driving wheels and a steering wheel journalled in said frame, a body tiltably mounted on said frame, a pair of shafts journalled in said frame, ratchet and pinion gears on each of said shafts, said pinion gears being in mesh, pawls mounted on said body adjacent to said ratchets, means connecting one of said shafts with said driving wheels, and means for turning said steering wheel.

5. In a hobby horse a frame, driving wheels journalled in said frame, a body tiltably mounted on said frame, gearing mounted on said frame and pawls on said body whereby tilting said body will rotate said driving wheels, and means for disengaging said pawls from said gearing.

6. In a hobby horse, a frame, driving wheels journalled in said frame, a pair of upwardly projecting standards mounted on said frame, a hollow body tiltably supported on said standards, a pair of shafts journalled in said standards within said hollow body, pairs of meshing gears and ratchets mounted on said shafts, pawls arranged within said body to severally engage said ratchets and means operatively connecting one of said shafts with one of said driving wheels.

In testimony whereof, I have hereunto signed my name to this specification.

CHARLES H. LISTER.